United States Patent [19]

Schmidt et al.

[11] Patent Number: 4,738,366
[45] Date of Patent: Apr. 19, 1988

[54] LIGHT-PROOF REMOVABLE SHEATHING FOR FILM PACKS OF PHOTOGRAPHIC OR X-RAY SHEET FILMS

[75] Inventors: Manfred Schmidt, Kirchheim, Fed. Rep. of Germany; Dirk Peeters, Kontich; Emiel Wollaert, Antwerp, both of Belgium; Johann Zanner, Unterhaching, Fed. Rep. of Germany

[73] Assignee: Agfa-Gevaert AG, Leverkusen, Fed. Rep. of Germany

[21] Appl. No.: 33,031

[22] Filed: Mar. 30, 1987

[30] Foreign Application Priority Data

Apr. 16, 1986 [DE] Fed. Rep. of Germany ....... 3612710

[51] Int. Cl.⁴ .............................................. B65D 5/54
[52] U.S. Cl. .................................. 206/630; 206/455; 206/631; 206/614; 206/632; 383/84; 383/67
[58] Field of Search ............... 206/455, 456, 809, 631, 206/601, 605, 608, 609, 611–615, 628, 630, 632, 633; 383/95, 59, 57, 66, 67, 93, 68, 69, 107, 123, 84; 229/77, 79, 87.5, 82, 92, 92.1, 92.7, 92.8

[56] References Cited

U.S. PATENT DOCUMENTS

| | | | |
|---|---|---|---|
| 3,368,737 | 2/1968 | Ingle | 206/612 |
| 3,580,483 | 5/1971 | Young | 206/631 |
| 3,826,421 | 7/1974 | Morse et al. | 206/631 |
| 4,041,202 | 8/1977 | Williams | 206/631 |

FOREIGN PATENT DOCUMENTS 2914206 10/1980 Fed. Rep. of Germany ...... 206/630

Primary Examiner—Willis Little
Attorney, Agent, or Firm—Michael J. Striker

[57] ABSTRACT

A light-proof tearable sheathing for a pack of photographic or X-ray sheet films insertable in a film supply magazine of a film cassette-loading device includes a winding flap which is wound on a shaft of the winding device to pull the sheathing from the film pack, a folded connection flap opposite to the winding flap and glued to the sheathing by a glue tape, and a tearing tape provided between two spaced strips of the glue tape and tearable from the sheathing to open the latter for the removal therefrom of individual film sheets.

9 Claims, 4 Drawing Sheets

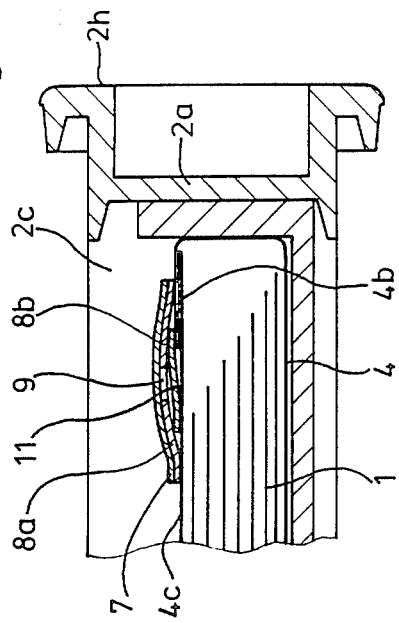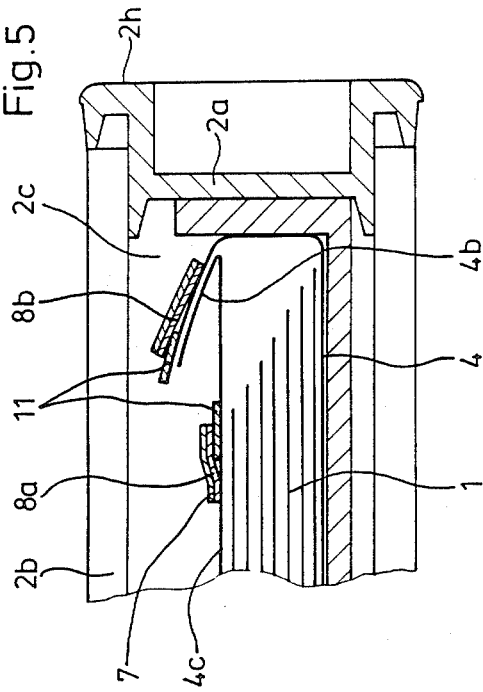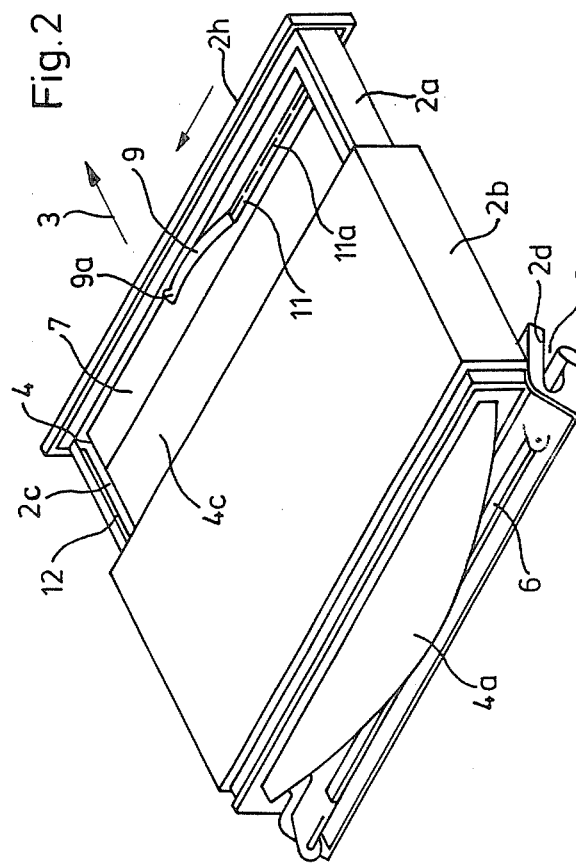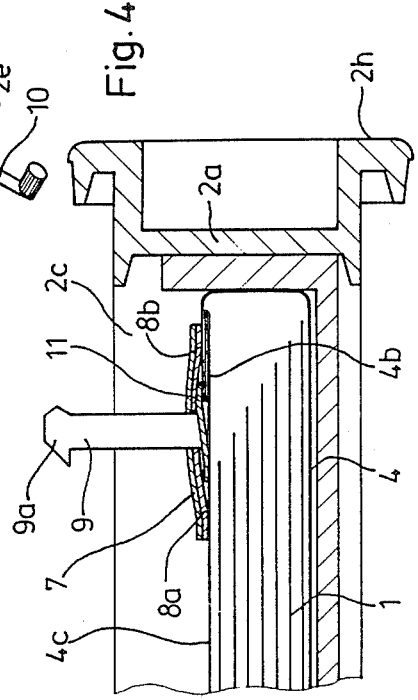

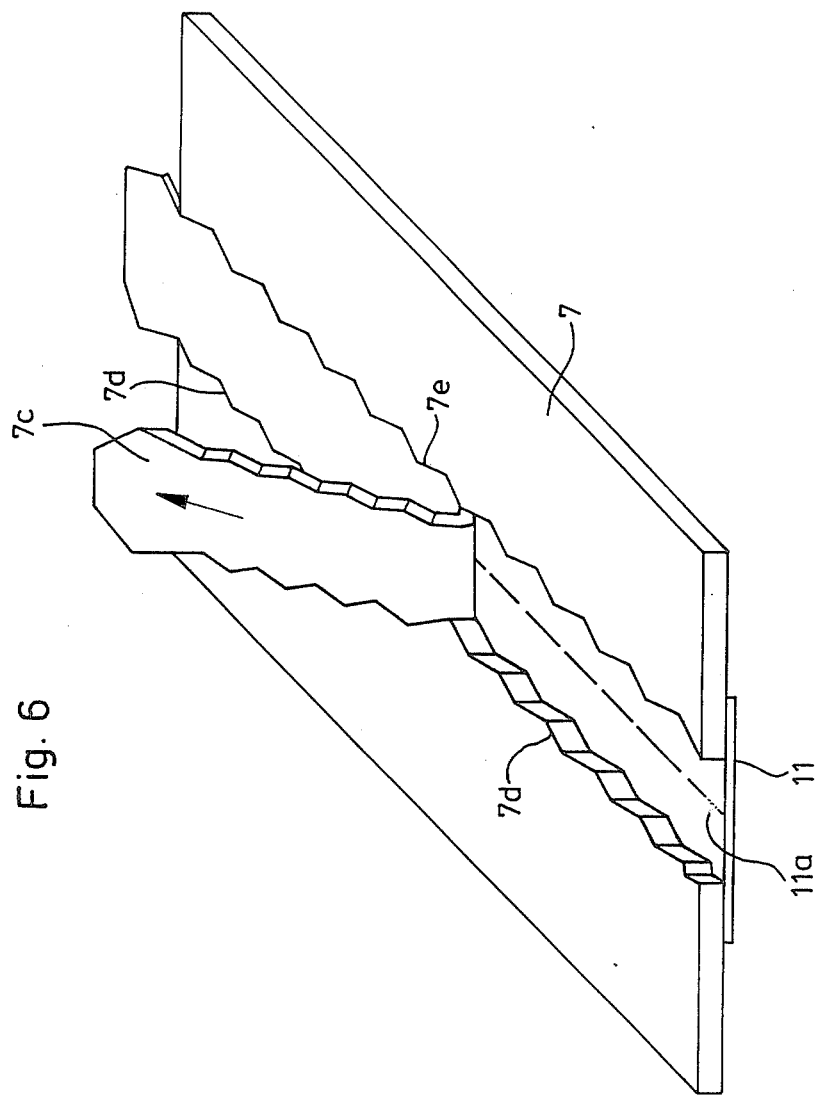

LIGHT-PROOF REMOVABLE SHEATHING FOR FILM PACKS OF PHOTOGRAPHIC OR X-RAY SHEET FILMS

BACKGROUND OF THE INVENTION

The present invention relates to a light-proof tearable wrapping or sheathing in which a pack of photographic or X-ray sheet films is enclosed and which wrapped pack is insertable in a film supply magazine of a sheet film cassette-loading device.

Light-proof removable wrappings or sheathings for film packs of sheet films have been known. Wrapped film packs are inserted in the supply magazine, at the side of which opposite to the side of the insertion of the film pack a pulling device is provided, which is preferably a winding device for the removal of the sheathing from the supply magazine. The sheathing of each film pack has a winding flap which, after the supply magazine with the film pack therein has been closed, is together with the sheathing removed from the magazine.

The film packs with such a sheathing are commercially available. The sheathing must be open in a dark room and the film pack be inserted into the film supply magazine. Efforts have been made to insert the film pack provided with a light-proof sheathing into the magazine at the day light and to open and remove the sheathing after closing of the magazine.

A supply magazine of the foregoing type has been disclosed in DE-GMS No. 77 25 804. A tearing flap of the sheathing is formed by labyrinth-shaped ends of the flap of the sheathing whereby a folding must be ripped due to a pulling force exerted by the rotation of a winding device provided on the supply magazine so that the sheathing is pulled from the film stack previously wrapped therein and wound on the winding device. It has been however established that the force applied to the winding device has not been sufficient to tear the flaps from each other. Thus the known device for operation at day light cannot be used for loading magazines and opening the sheathing of the pack in the closed magazine.

A supply magazine disclosed in DE-PS No. 34 05 423 is provided with a device for opening the pack sheathing, which device is usable with a specific type of film supply magazines. For other types of magazines for example such as disclosed in the aforementioned DE-GMS 77 25 804, a foled tearing flap of the sheathing must be pulled not by the winding device but by hand. The force, however, cannot be practically applied for tearing up of the folded flap.

A supply magazine disclosed in DE-OS No. 35 43 024 is utilized for pack sheathings which have a knife-shaped or saw blade-shaped tearing strip for removing the sheathing from the closed magazine. The disadvantage of this otherwise satisfactory device resides in that the day light loading of the supply magazine is possible only with a certain type of the magazine while film packs for loading of various types of the magazines, for example disclosed in DE-GMS No. 77 25 804 must be usable at day light.

SUMMARY OF THE INVENTION

It is an object of the present invention to provide an improved sheathing for film packs insertable in film supply magazines.

It is a further object of the invention to provide a film pack sheathing with a connection which is tear-resistant on the one hand, and is held by weight of the pack in the sheathing, on the other hand.

It is yet another object of this invention to provide a film pack sheathing which is removable from the film pack only when the magazine is light-proof closed and which ensures that the force applied to the winding device of the magazine is sufficient to fully release the connection part of the sheathing to open the latter and remove it from the pack when the magazine is fully closed.

These and other objects of the invention are attained by a light-proof tearable sheathing for a pack of photographic or X-ray sheet films insertable in a film supply magazine of a film cassette-loading device, wherein the supply magazine is provided at a side thereof opposite to that at which the sheathing is tearable, with a winding device for the removal of the sheathing from the pack, said sheathing comprising a winding flap which is connectable to said winding device for said removal after the supply magazine has been closed, said sheathing further including a folded connection flap which is glued to a flat side of the sheathing by glue tape said glue tape having two elongated parallel strips spaced from each other, one of said strips being glued to said flat side and the other of said strips being glued to said connection flap, a tearing tape positioned in a region between said elongated strips and tearable therefrom, and a thin foil positioned below said region and having in the direction of elongation of said strips a perforation which is breakable upon pulling in a direction normal to said direction of elongation.

Said foil can be of plastic or paper.

Two additional parallel elongated glue strips may be provided each positioned between each of said strips and said flat side, one of said additional glue strips being glued between said flat side and one of said strips and the other of said additional strips being glued between the other of said strips and said connection flap.

The tearing tape may have two parallel perforation rows and a rip portion positioned between said rows and tearable from said tearing tape.

The tearing tape may include tape pieces spaced from each other in the direction of elongation of said tape by narrow transverse cross-pieces which are breakable upon pulling normal to the direction of elongation of said strips.

The thin foil or the cross pieces may be dimensioned so that said connection flap after breaking said tearing tape is held stable and is tearable from the sheathing by said winding device of the supply magazine upon actuation of said winding device.

Said foil may be wider than said region so that said foil at least partially overlaps said strips, said foil being at edges thereof at least partially glued to said glue tape.

It has been obtained with this invention that with a partial removal of the glue tape, namely at the non-glued transition zones between the connecting flap and the respective flat side of the sheathing a weakened connection between the connection flap and the sheathing surface remains which still light-proof holds the sheathing and can be ripped off, only after the closing of the supply magazine, by small forces applied to the winding device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a perspective view of the film pack upon insertion thereof into a film supply magazine;

FIG. 3 is a partial sectional view of the open supply magazine with the inserted closed wrapped film pack of the invention;

FIG. 4 is a sectional view similar to that of FIG. 3 showing the ripping of a lock portion of the film pack;

FIG. 5 is a sectional view similar to that of FIGS. 3 and 4 but after the supply magazine has been closed and during the removal of the film pack sheathing from the pack;

FIG. 6 is a broken perspective view of the film pack lock of another embodiment.

DETAILED DESCRIPTION OF THE PREFERRED EMBODIMENTS

Figure 1:
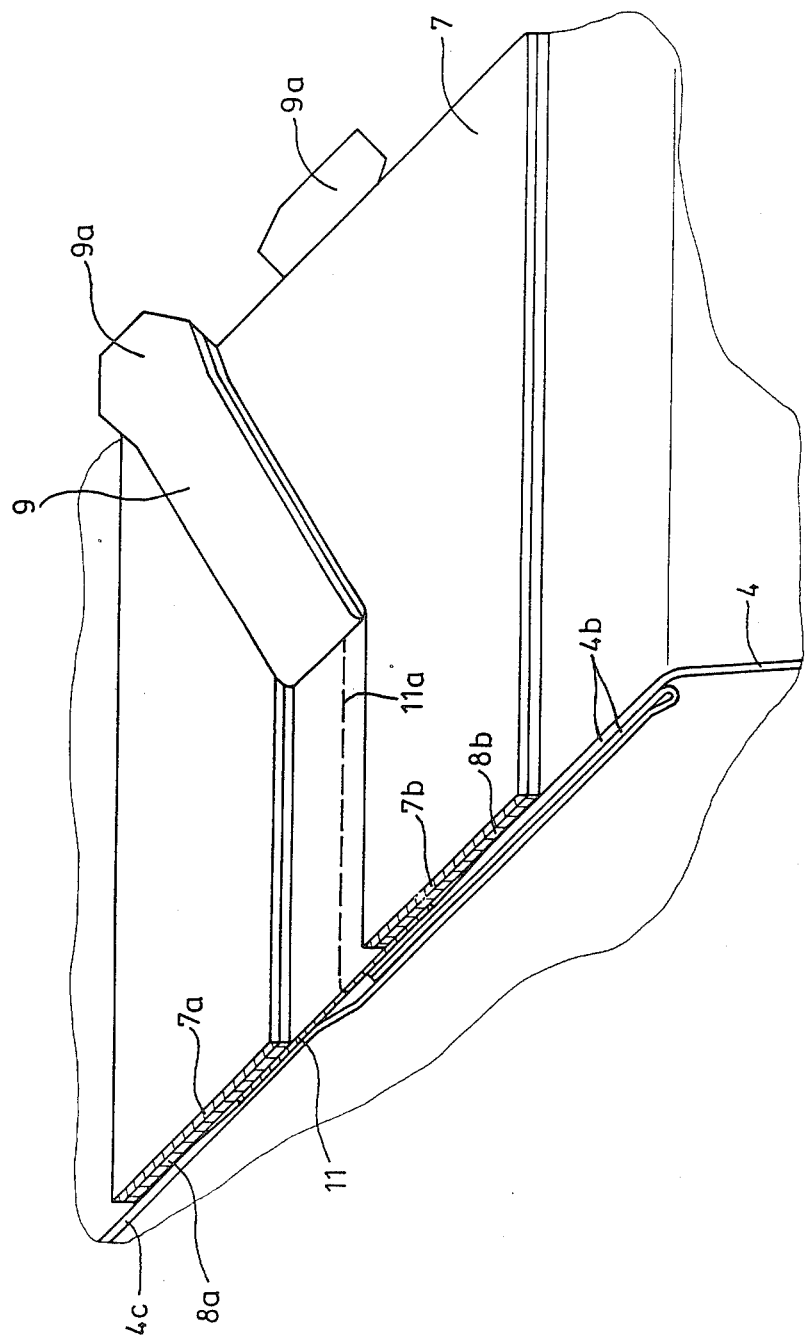
FIG. 1 is a broken perspective view of a wrapped film pack of the invention.

Referring first to FIG. 2 it will be seen that a film supply magazine is comprised from a box 2a which is partially opened from above and a cover 2b formed as a slide tube. An insertion opening 2c of the box 2a lies adjacent the end face 2h lying in the direction of loading of the cassette. Reference numeral 3 designates the direction of insertion of the magazine into a device for the removal of individual film sheets from the pack stored in the magazine. The film sheet removing device is conventional and not shown herein. The insertion opening 2c is only as large as to enable a film pack or a film stack 1 to be inserted in the box 2a and be positioned therein and to be closed light-tight upon the displacement of the slide tube 2b.

A rear magazine side 2d, as viewed in the direction of insertion 3, can be formed as a gripping part for sliding the magazine 2 into the above mentioned loading device. The rear side 2d is formed as a pivotable rear wall which is in its closed position light-tight. A winding shaft 6 for winding on a wrapping or sheathing 4 removable from the film pack is supported in the protrusions provided in the inner surface of the rear wall 2d. The winding shaft has a fastening means by which a winding flap 4a of the sheathing 4 of the newly inserted film pack 1 is connectable to the winding shaft 6. The winding shaft 6 can be directly or by a gearing coupled with a winding handle 10 which extends light-sealed outwardly from the box 2a. The handle 10 can have a pivotable non-shown hinge so that the handle can be pivoted between a shown operation position and a non-operative position in a recess 2e provided in the rear wall 2d. The non-operative position is obtained when the magazine 2 is inserted into the unloading device.

For a repeated loading of the magazine 2, the insertion opening 2c must be released via the slide cover 2b and the winding shaft 6 must be released by opening of the rear wall 2d. Then the sheathing or wrapping 4 of the removed film stack 1, wound on the winding shaft 6 is pulled from the shaft 6 and a reinforcing and holding cardboard 12 provided below the emptied stack is taken off from the box 2a. The cardboard 12 has at the rear side a protruding abutment. The holding cardboard 12 together with its abutment serves to prevent a displacement of the film pack or its individual film sheets from being taken along by the sheathing 4 when the sheathing is pulled off the stack 1 in the closed magazine.

As can be seen from FIGS. 2 and 3, if a new film pack wrapped in the sheathing 4 is inserted through insertion opening 2c into the box 2a the winding flap 4a is guided to the region of the winding shaft 6 and is secured on the winding shaft 6. Then the rear wall 2d is closed, by pivoting of the handle 10. Thereby the sheathing 4 with the film pack laid into the previously open box 2a is completely closed. After the closing of the magazine cover 2b and upon rotating of the handle 10, the sheathing 4 can be ripped off from the film pack and can be removed from the latter; this is provided by a specific lock of the sheathing 4, which will be described in detail below.

The sheathing or wrapping 4 is provided on its periphery with a folded connecting flap 4b lying on the upper flat side 4c of the sheathing so as to form protection against light. The connecting flap 4b is glued to the upper flat side 4c by a specifically formed gluing tape 7 and is therefore rigidly secured to that upper side. This connection cannot be released even if customary heavy film packs with the sheathings are utilized.

According to the embodiment illustrated in FIGS. 1-5 the gluing tape 7 is formed of a smooth continuous plastic flat tape or paper-plastic combination. This tape 7 is, on the one hand, glued longitudinally of its both side portions 7a, 7b (FIG. 1) to a unit with two glue strips 8a, 8b spaced from each other. One of glue strips 8a, 8b is glued with the flat side 4c of the sheathing 4 and the other of the glue strips is glued to the sheathing over the entire width by the connecting flap 4b. As shown in FIG. 1 the locking flap 4b is formed as a protruding loop of the upper wall at side 4c of the sheathing. A tearing tape 9 or a releasing rip is inserted into the region or space between two offset glue strips 8a and 8b so that a gripping flap 9a is provided which can extend over the side edges of the sheathing. Below the tearing tape 9 is provided a paper strip 11 which overlaps the region occupied by the tearing tape 9 in a closed position. The paper strip 11 is secured at the outer portions thereof to the glue strips 8a, 8b. The width of the paper strip 11 is greater than the width of the tearing tape 9 but smaller than the width of the gluing tape 7 so that the gluing tape 7 with the glue strips 8a, 8b connected thereto extends a sufficient distance at both sides beyond the paper strip 11 in order to rigidly glue the locking flap 4b with the flat side 4c of the sheathing 4. The paper strip 11 further has an elongated perforation 11a which is positioned in the region between the connecing flap 4f and the side 4c of the sheathing, not glued to the glue strips 8a, 8b.

After the insertion of the film pack 1 into the box 2a and closing the rear wall 2d the upper continuous gluing tape 7 with the tearing tape 9 are ripped off over the width of tape 9 and over its entire length as shown in FIGS. 1, 2 and 4. Thereby the connecting flap 4b is glued by means of paper strip 11 over the entire width to the flat side 4c of the sheathing 4 and the sheathing is light-tight enclosed. Now the cover 2b is displaced over opening 2c of the box 2a and the magazine 2 becomes light-tight closed.

The paper strip 11 is, due to its perforation 11, formed so that this strip is easily separable along the entire perforation by a small force applied perpendicular to its length. If the magazine 2 is closed then by the rotation of the handle and thus the winding shaft 6 the paper strip 11 is torn off at the perforation 11a the locking flap 4b is lifted as shown in FIG. 5. Now, if in the light-tight closed position of the magazine 2 the sheathing 4 of the film pack 1 is also opened it can be pulled and wound on the winding shaft 6. Upon the interchanging of the film pack the wound sheathing 4 can be then removed from the winding shaft 6 and the winding flap 4a of the sheathing or wrapping of a new film pack be connected to the winding shaft.

In the embodiment illustrated in FIG. 6 only a rigid plastic gluing tape 7 is provided for gluing of the connecting flap 4b to the side 4c of the sheathing. This gluing tape 7 has two rows of perforations 7d, 7e which are relatively stable; a tearing tape 7c is inserted between perforations 7d and 7e. Below the tearing tape 7c is arranged the perforated paper strip 11 which overlaps perforation rows 7d, 7e. In place of the paper strip 11, a very thin plastic strip also having perforation 11a, can be utilized. The fashion of operation of the arrangement of FIG. 6 is the same as that of the embodiment of FIGS. 1 through 5. After the insertion of the wrapped film pack into the box 2a of the film magazine and suspending and connecting the winding flap 4a to the winding shaft 7 and closing the rear wall 2d the tearing tape 7c is ripped off from the sheathing 4 over the entire width thereof. The connecting flap 4b and the upper side 4c of the sheathing are then however light-tight held together by the perforated paper strip 11. After the closing of the cover 2b the perforation 11a is torn transversely to its length by actuating the shaft 6, so that sheathing 4 is pulled off from the film pack and can be wound on the shaft 6.

Figure 7:
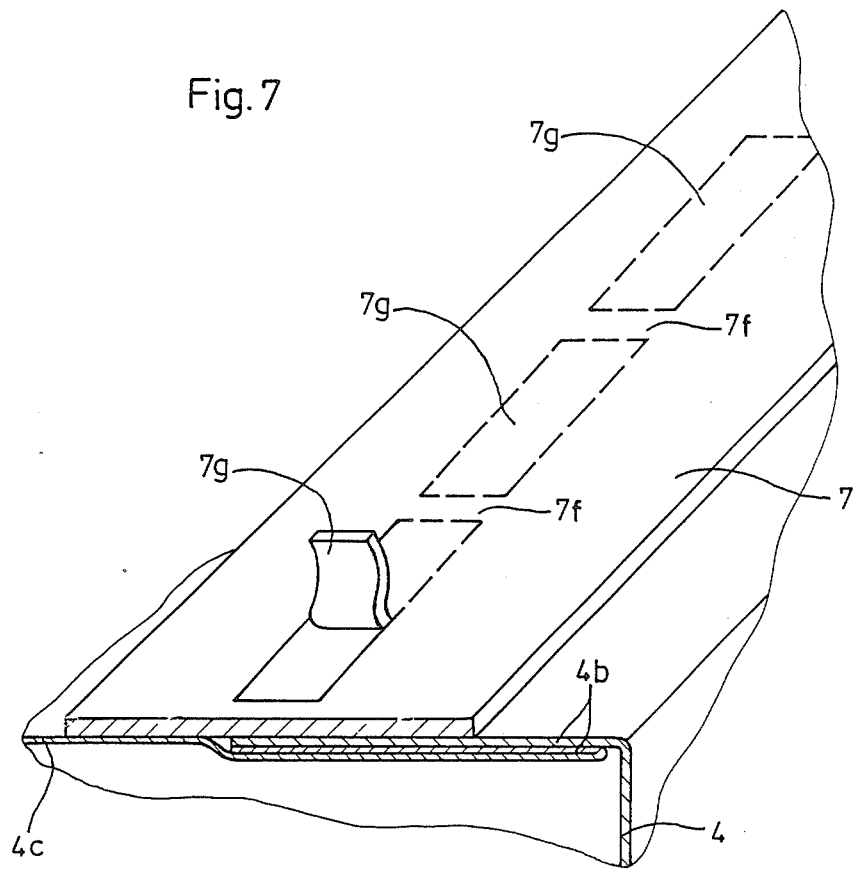
FIG. 7 is a broken perspective view of the film pack lock of yet further embodiment.

In the embodiment depicted in FIG. 7 the rip holding the glue strips 8a, 8b and the perforated strip 11 can be omitted. Here the gluing tape 7, namely in the nonglued region at the border between the connecting flap 4b and the side 4c of the sheathing 4, is provided with a plurality of rectangular perforated elongated portions 7g spaced from each other by cross-pieces 7f and separable from the tape 7. After the insertion into the magazine box 2a the rectangular portion 7g formed as small tapes are ripped off one after the other from the tape 7. Now the sheathing 4 and flaps 4b, 4c are light-tight held together by small cross-pieces 7f. After the closing of the magazine 2 these cross-pieces 7f are torn off by the rotation of the winding shaft without any additional application of force so that the same situation as in the embodiment of FIG. 5 occurs, that is the locking flap 4b is released upon the breaking of the glue connection and the sheathing 4 can be pulled away.

The principle of the proposed invention resides in that the connecting flap 4b of the film pack sheathing 4 is glued with the flat side of the sheathing and is thereby secured by the weight of the film pack so that, upon the insertion of the film pack into the film supply magazine and before the closing of the same the glue connection is weakened by the tearing but is not fully broken and the remaining weakened connection is totally released by a device for the removal of the sheathing after the magazine has been closed.

According to the above described principle other embodiments then those shown in FIGS. 1-7 are possible. For example, in the embodiment of FIG. 6, perforations 7d may be omitted so that the glue tape 7 would have greater initial stability and rips would be provided at respective places below the glue tape 7. By ripping off the both rips a strip corresponding to the strip 7c would be cut off via perforation 11a of the paper strip 11. The magazine-side pulling device can have a light-proof slot through which the winding flap 4a can be inserted and pulled by hand to remove sheathing 4 from the film pack.

It will be understood that each of the elements described above, or two or more together, may also find a useful application in other types of light-proof removable sheathings for film packs differing from the types described above.

While the invention has been illustrated and described as embodied in a light-proof removable sheathing for a film pack of photographic or X-ray film sheets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A light-proof tearable sheathing for a pack of photographic or X-ray sheet films insertable in a film supply magazine of a film cassette-loading device, wherein the supply magazine is provided at a side thereof opposite to that at which the sheathing is tearable, with a winding device for the removal of the sheathing from the pack, said sheathing comprising a winding flap which is connectable to said winding device for said removal after the supply magazine has been closed, said sheathing further including a folded connection flap (4b) which is glued to a flat side of the sheathing by a glue tape (7), said glue tape having two elongated parallel strips (7a, 7b) spaced from each other, one of said strips being glued to said flat side and the other of said strips being glued to said connection flap, a tearing tape (9, 7c) positioned in a region between said elongated strips and tearable therefrom, and a thin foil (11) positioned below said region and having in the direction of elongation of said strips a perforation (11a) which is breakable upon pulling in a direction normal to said direction.

2. The sheathing as defined in claim 1, wherein said foil is of plastic material.

3. The sheathing as defined in claim 1, wherein said foil is of paper.

4. The sheathing as defined in claim 1, wherein said two additional parallel, elongated glue strips (8a, 8b) are provided each positioned between each of said strips and said flat side, one of said additional glue strips being glued between said flat side and one of said strips and the other of said additional strips being glued between the other of said strips and said connection flap.

5. The sheathing as defined in claim 1, wherein said tearing tape has two parallel perforation rows and a rip portion (7c) positioned between said rows and tearable from said tearing tape.

6. A light-proof tearable sheathing for a pack of photographic or X-ray sheet films insertable in a film supply magazine of a film cassette-loading device, wherein the supply magazine is provided at a side thereof opposite to that at which the sheathing is tearable, with a winding device for the removal of the sheathing from the pack, said sheathing comprising a winding flap which is connectable to said winding device for said removal after the supply magazine has been closed, said sheathing further including a folded connection flap (4b) which is glued to a flat side of the sheathing by a glue tape (7), said glue tape having two elongated parallel strips (7a, 7b) spaced from each other, one of said strips being glued to said flat side and the other of said strips being glued to said connection flap, and a tearing tape positioned in a region between said strips, said tearing tape including tape pieces (7g) spaced from each other in the direction of elongation of said tape, by narrow transverse cross-pieces (7f) which are breakable upon pulling normal to the direction of elongation of said strips.

7. The sheathing as defined in claim 6, further including a thin foil positioned below said region and having in the direction of elongation a perforation which is dimensioned so that said connection flap after breaking said tearing tape is held stable and is tearable from the sheathing by said winding device of the supply magazine upon actuation of said winding device.

8. The sheathing as defined in claim 6, wherein said transversal cross-pieces are so dimensioned that said connection flap after breaking said tearing tape is held stable and is tearable from the sheathing by said winding device of the supply magazine upon actuation of said winding device.

9. The sheathing as defined in claim 1, wherein said foil is wider than said region so that said foil at least partially overlaps said strips, said foil being at edges thereof at least partially glued to said glue tape (7).

* * * * *